United States Patent
Bain

(10) Patent No.: US 7,320,085 B2
(45) Date of Patent: Jan. 15, 2008

(54) SCALABLE, SOFTWARE-BASED QUORUM ARCHITECTURE

(75) Inventor: William L Bain, King County, WA (US)

(73) Assignee: Scaleout Software, Inc, King County, WA (US)

( * ) Notice: Subject to any disclaimer, the term of this patent is extended or adjusted under 35 U.S.C. 154(b) by 147 days.

(21) Appl. No.: 11/074,260

(22) Filed: Mar. 7, 2005

(65) Prior Publication Data
US 2005/0262382 A1    Nov. 24, 2005

Related U.S. Application Data

(60) Provisional application No. 60/551,425, filed on Mar. 9, 2004.

(51) Int. Cl.
*G06F 11/00* (2006.01)
(52) U.S. Cl. .................... 714/4; 710/200; 718/104
(58) Field of Classification Search ........... 718/104, 718/105; 709/213–216, 201, 220, 225, 226, 709/229; 714/4, 6, 12, 47; 710/200, 220; 707/9, 10; 711/150
See application file for complete search history.

(56) References Cited

U.S. PATENT DOCUMENTS

| | | | |
|---|---|---|---|
| 6,314,526 B1 * | 11/2001 | Arendt et al. | 714/4 |
| 6,487,622 B1 * | 11/2002 | Coskrey et al. | 710/241 |
| 6,662,219 B1 * | 12/2003 | Nishanov et al. | 709/220 |
| 6,801,937 B1 * | 10/2004 | Novaes et al. | 709/220 |
| 6,847,993 B1 * | 1/2005 | Novaes et al. | 709/221 |
| 6,950,855 B2 * | 9/2005 | Sampathkumar | 709/209 |
| 7,120,681 B2 * | 10/2006 | Frelechoux et al. | 709/221 |
| 2005/0273571 A1 * | 12/2005 | Lyon et al. | 711/203 |

* cited by examiner

*Primary Examiner*—Robert W. Beausoliel
*Assistant Examiner*—Elmira Mehrmanesh
(74) *Attorney, Agent, or Firm*—James L Davison

(57) ABSTRACT

A cluster of computers typically establishes a quorum, i.e., a software method for establishing agreement, to coordinate access to shared resources, such as a shared data store, in applications that must recover from the failure of one or more computers or their associated components. Prior art which associates a single quorum with an entire cluster, has inherent overheads that limit the size of the cluster to a small number of computers. The present invention comprises a scalable, software-based architecture for implementing a quorum mechanism to coordinate the actions of a cluster of computers. In contrast to prior art, the present invention advantageously encapsulates the quorum in a software construct, called a quorum object, which is disassociated from the cluster as a whole and spans a designated subset of the cluster's membership. By employing multiple quorum objects that are distributed across the cluster's membership, the cluster can uniformly scale to a large number of computers that handle a scalable processing workload, such as a partitioned database management system. The software methods that implement one embodiment of the present invention are described in detail.

4 Claims, 10 Drawing Sheets

SCALABLE, SOFTWARE-BASED QUORUM ARCHITECTURE

CROSS REFERENCE TO RELATED APPLICATIONS

This application is entitled to the benefit of Provisional Patent Application Ser. No. 60/551,425 filed Mar. 9, 2004.

BACKGROUND—FIELD

The present invention relates to methods associated with requiring a sufficient quorum of nodes before allowing such nodes to assume responsibility for a cluster's resources.

BACKGROUND—DESCRIPTION OF RELATED ART

A computer system for storing and retrieving data consists of a physical data store and software service, called a data manager, as shown in FIG. 1, which together form what is commonly known as a database management system or DBMS. It is desirable for the DBMS to survive the failure of a computer and continue to provide service to its clients; such a DBMS can be called a highly available DBMS. (Note that the term highly available has varying definitions in the computing literature; this definition is used for the purposes herein.) A well known method for making a DBMS highly available is to employ multiple, cooperating computers, called a cluster, to host the DBMS. The data manager runs on one computer and is restarted on a different computer if a failure occurs. Data is shared by the computers by either using a single, shared physical medium (such as a disk array on a storage area network) or by keeping an identical copy of the data in the local stores on multiple computers and replicating changes between the computers as necessary. These two cluster architectures are shown respectively in FIGS. 2 and 3. In these figures, the data manager runs on host 0 within the cluster. FIGS. 4 and 5 respectively show these clusters after the failure of host 0. Note that the clusters have started a new data manager in host 1 to replace the data manager that had been running in host 0 prior to the failure. In FIG. 5, host 1's store (local store 1) serves as the replica store for host 0's data manager and subsequently becomes the primary store host 1's data manager after the failure of host 0. Host 2's store (local store 2) is the replica store for host 1's data manager.

To maintain the integrity of the data store, it is vital that data managers running on different computers (also called hosts) properly coordinate their actions so that only one data manager updates the data store. Otherwise, updates to the data store could be overwritten and lost. For example, consider the example in FIG. 6 in which a DBMS using a shared data store processes four sequential updates, labeled U1, U2, U3, and U4, from a networked client computer. The data manager initially runs on host 0 and successfully completes updates U1 and U2. After receiving update U3, host 0 suffers a processing delay that temporarily keeps it from communicating with host 1 and from completing update U3 for a short period of time. Host 1 observes this delay as a failure in host 0, and recovers by starting a new data manager that takes over the processing of updates. Host 1's data manager completes U3 (after the client retries) and then U4. At this point, host 0 resumes normal operations and completes update U3. Since update U3 is completed out of order (i.e., after U4), update U4 is lost, and the data store is corrupted. This undesired behavior, often called split brain, results from the failure of host 0 and host 1 to properly coordinate their actions in detecting and recovering from failures. FIG. 7 shows a similar scenario with a DBMS that uses a replicated data store, in which the replica(s) of the data store become inconsistent and thus corrupted. After host 0 resumes normal operation, it stores U3 in its local store and replicates U3 to local store 1. This overwrites update U4 in local store 1, and update U4 is lost.

As seen above, improper coordination between data managers running on different cluster hosts can result in lost updates. This problem is normally solved by ensuring that there is exactly one active data manager processing update requests. In this case, a data manager cannot unexpectedly resume operation while another data manager is running. The process of designating a single cluster host to coordinate a cluster's actions, such as running a data manager, can be accomplished by first establishing a unique subset of running cluster hosts, called a quorum, and then by electing a single host, called the quorum leader, among this subset. The quorum encompasses a group of hosts in the cluster which can mutually communicate. Multiple such groups can exist due to communication failures, and the method for establishing a quorum ensures that only one quorum is formed. Cluster hosts outside of the quorum do not participate in processing the workload. Since the unique quorum leader designates a specific host in the quorum to run a data manager, its data store cannot become corrupted and lose updates.

Beyond simply constructing a highly available DBMS, it is highly desirable to scale the DBMS's performance to handle large and growing processing loads. A well known technique for scaling a DBMS partitions the DBMS's data store into multiple, smaller stores, each with a highly available data manager handling its associated store. By running the partitions on different hosts within a cluster (as selected by the quorum leader), the DBMS's overall performance grows with the cluster membership's size. To handle very large DBMS processing loads, large clusters (e.g., sixty-four hosts or more) may be required. Therefore, it is necessary that the method for establishing a quorum scale to accommodate large clusters.

Note that a quorum is generally useful for coordinating access by multiple computers to shared resources in highly available systems. In addition to the data stores within a DBMS, these resources can include shared memory systems, peripheral devices, and external controllers (such as the hydraulic actuators for the rudder of ship's steering system).

There are several methods that have been devised in prior art to establish a quorum across a cluster of computers. When using a shared data store, a token can be held in the store (e.g., on a disk) and reserved by exactly one cluster host; this is called a shared store quorum protocol. Other hosts do not run data managers while they do not hold the token. When using replicated data stores, the cluster hosts can use a protocol, called a majority host quorum protocol, for electing the quorum leader. This protocol first establishes that the set of communicating hosts represents a majority of all cluster hosts and then selects a particular host (e.g., the host with the lowest host identifier) to serve as quorum leader and run the data manager. By determining that a majority of hosts are present, two non-communicating subgroups of cluster hosts cannot concurrently form independent quorums. In the very important case of a cluster with two hosts, a quorum cannot be formed when these two hosts cannot communicate. In this situation, they cannot determine whether the other host has failed or simply cannot communicate, and no quorum is formed to avoid the split brain problem described above.

In order for cluster hosts to establish a quorum in the above methods, they must first determine the cluster's membership, i.e., the set of computers that cooperate to form a cluster. Each host maintains a list, called a membership list, that enumerates its view of the hosts within a cluster, called the cluster set, and it modifies the list as it detects that other hosts have joined or left the group. A host can voluntarily leave the group or it involuntarily leaves after suffering a failure and ceasing to communicate with other hosts. The implementation of the cluster's membership needs to quickly detect changes in the cluster set so that the quorum can be re-established if necessary. In the case of a majority host quorum, all hosts must have previously reached consensus as to the largest possible cluster membership, and this consensus must be re-established whenever a cluster host is newly added or permanently removed from the cluster.

To scale the performance of a highly available DBMS, a well known technique partitions the DBMS's data store into multiple, smaller stores with a data manager handling each portion of these sub-stores. By running the partitions on different hosts within a cluster (as selected by the quorum leader), the DBMS's overall performance grows with the cluster membership.

The methods described above for establishing a quorum do not scale well to large clusters with many cluster hosts. In the shared store protocol, the use of a shared data store to hold a token becomes a bottleneck with increasing delay to contend for the store's token as the cluster set grows. The majority host protocol requires significant communication overhead to establish that a majority of hosts is present and to re-establish consensus after permanent membership changes occur; this overhead grows rapidly as the size of the cluster set increases. Also, the majority hosts quorum method does not scale gracefully since it requires odd cluster set sizes. For these reasons and others, highly available DBMS clusters typically have a relatively small number of cluster hosts (e.g., two to eight hosts).

To solve the scaling problem, large DBMS clusters are generally constructed by aggregating multiple independent clusters, called sub-clusters. For example, FIG. 8 shows a cluster with four hosts composed of two sub-clusters; the cluster of sub-clusters is called a super-cluster. While avoiding the problem of scaling the cluster's quorum, this approach complicates the overall design in several ways. It requires that each cluster host participate in two memberships, one in a sub-cluster and another in the super-cluster. To preserve high availability of the super-cluster, the mechanisms for implementing high availability within each sub-cluster must be replicated for the super-cluster. Cluster hosts must participate in exactly one sub-cluster, and their resources cannot be shared between sub-clusters to balance the processing load.

SUMMARY

The present invention coordinates the actions of multiple computers (called hosts), within a computing cluster, to control access to multiple shared resources (such as partitions of a database). This is accomplished by employing the use of multiple, independent quorum algorithms, each of which is implemented as a separate logical construct called a quorum object. Each quorum object controls access to one of the multiple shared resources. Two or more of the hosts within the cluster are assigned as members of each quorum object. Any host may be a member of more than one quorum object so that quorum objects have overlapping memberships. A new quorum object may be created as needed for each shared resource and then be assigned to a subset of hosts within the cluster that are used to manage that resource. In this manner a computing cluster can scale by adding a single host instead of by requiring either (a) that a single quorum of all hosts manage all shared resources or (b) that a new sub-cluster be added (i.e., a new quorum with multiple new hosts assigned exclusively to that quorum).

BRIEF DESCRIPTION OF THE DRAWINGS

The invention is further described in connection with the accompanying drawings, in which.

DESCRIPTION OF THE PREFERRED EMBODIMENT

This section first describes the present invention and then describes its rationale and benefits.

Prior art for implementing a quorum associates a single quorum with an entire cluster, and this method has inherent overheads that limit the size of the cluster to a small number of computers. The use of multiple, independent sub-clusters to solve this scaling problem adds new complexity and inflexibility to the overall architecture. In contrast, the present invention defines a new software construct, called a quorum object, which runs on a designated subset of the cluster's membership. Quorum objects disassociate the implementation of a quorum from applying to the cluster as a whole. Instead, the cluster provides a homogeneous pool of computing resources for hosting quorum objects, and quorum objects encapsulate the implementation of a quorum spanning a subset of the cluster's hosts. By employing multiple quorum objects that are distributed across the cluster's membership, the cluster can uniformly scale to large numbers of computers that handle a large processing workload, such as a partitioned database management system.

Figure 1:
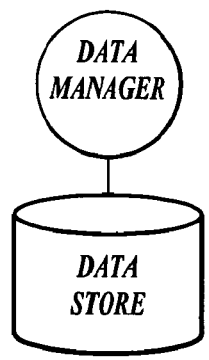
FIG. 1 shows a prior art model of a database management system.
Figure 2:
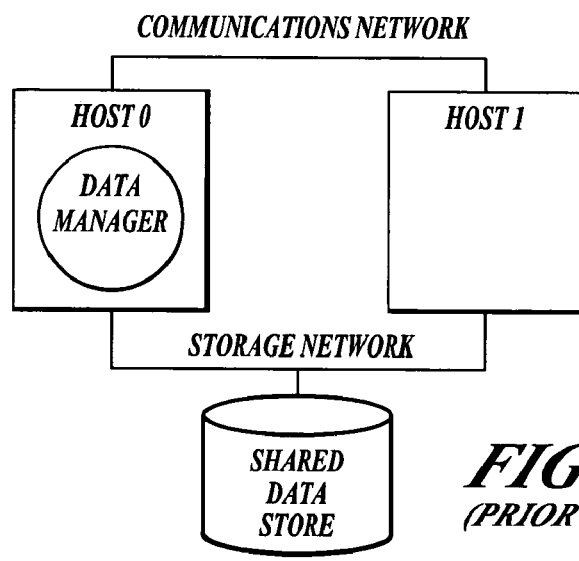
FIG. 2 shows a prior art example of a two-host, failover cluster with a shared data store.
Figure 3:
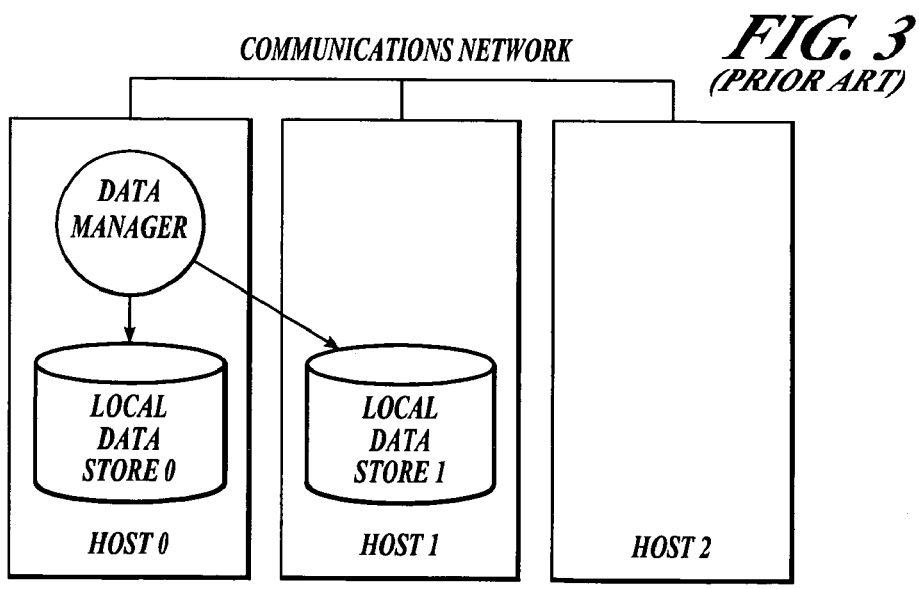
FIG. 3 shows a prior art example of a cluster with a replicated data store.
Figure 4:
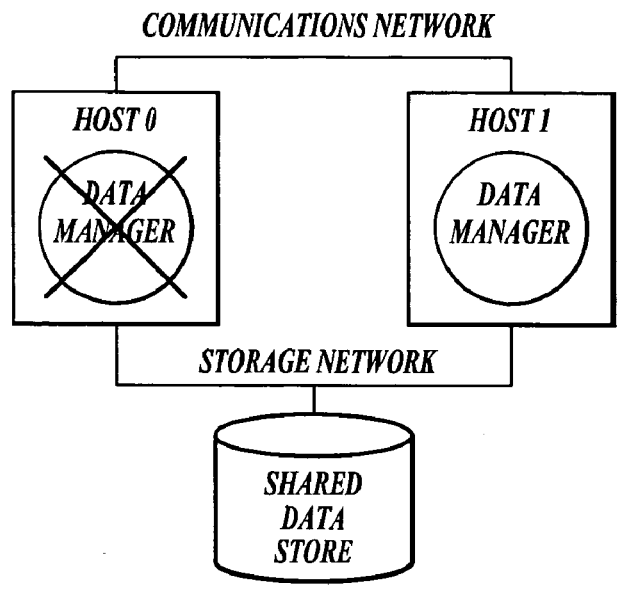
FIG. 4 shows a prior art example of a cluster with a shared data store after a host failure and failover of the data manager.
Figure 5:
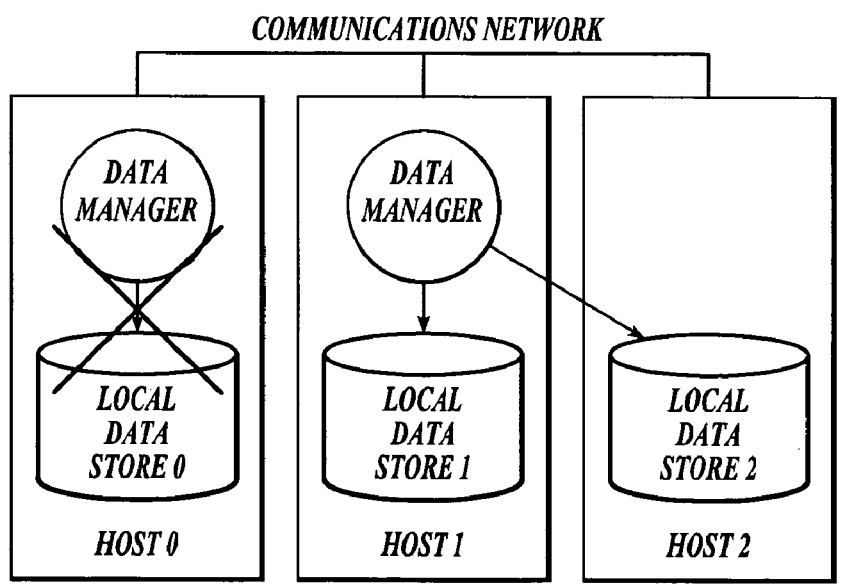
FIG. 5 shows a prior art example of a cluster with a replicated data store after a host failure and failure of the data manager.
Figure 6:
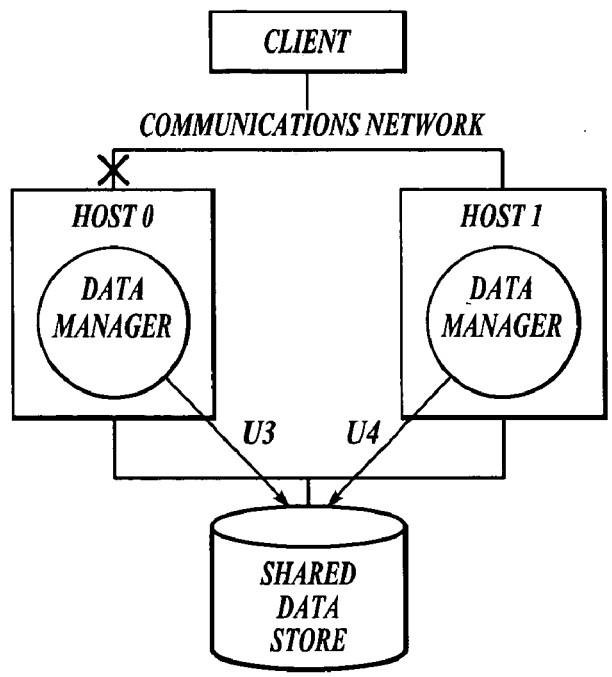
FIG. 6 shows a prior art example of a cluster with a shared data store after host 0 recovers from a processing and communications delay and stores update U3.
Figure 7:
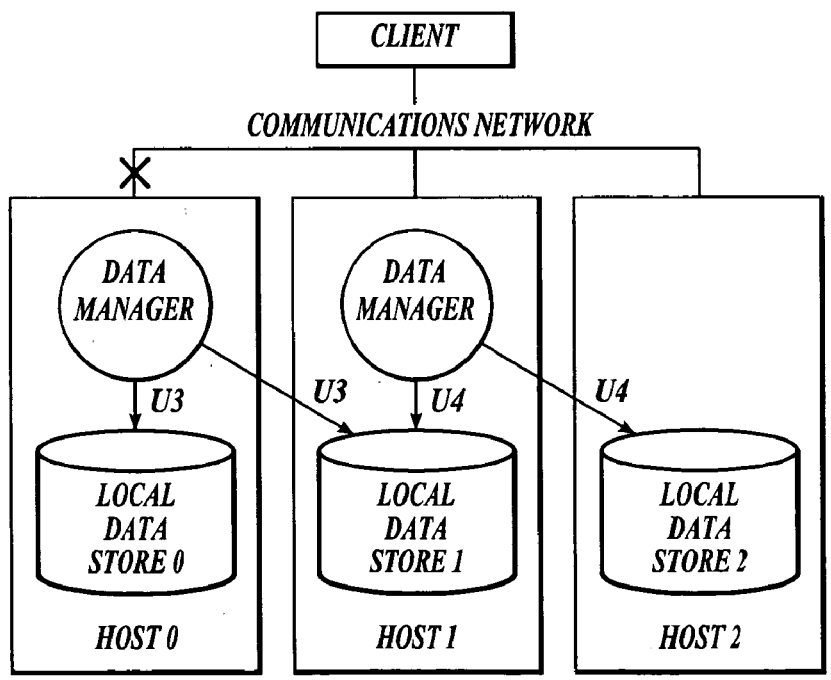
FIG. 7 shows a prior art example of a cluster with a replicated data store after host 0 recovers from a processing and communications delay and stores update U3.
Figure 8:
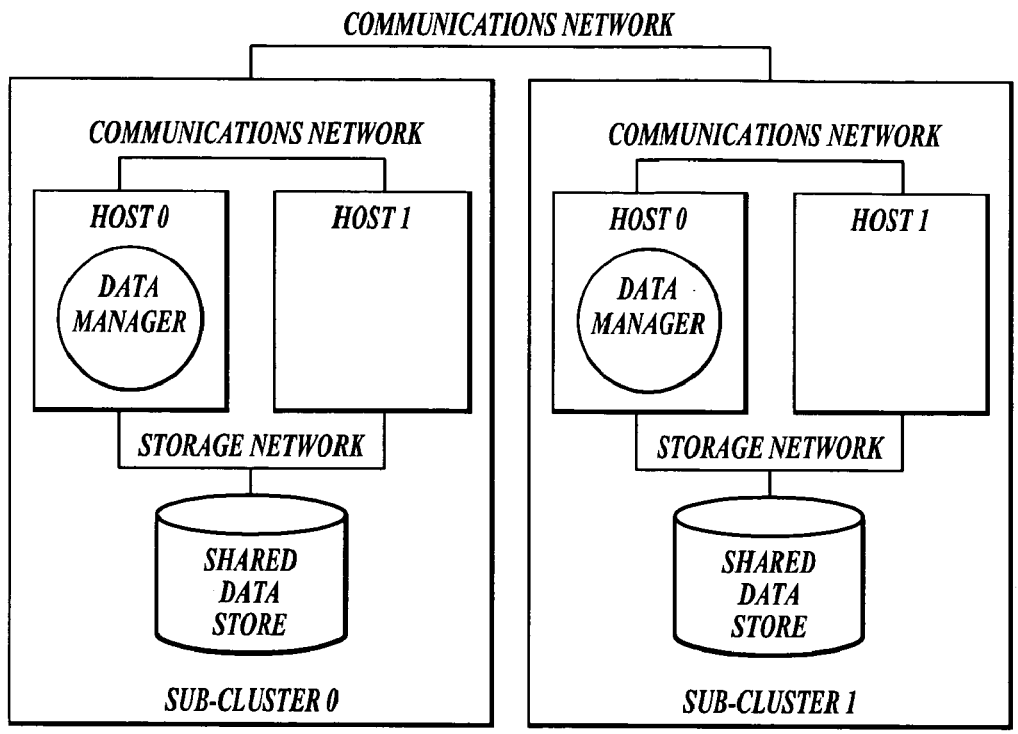
FIG. 8 shows an example of a prior art "super-cluster" with four hosts and two sub-clusters.
Figure 9:
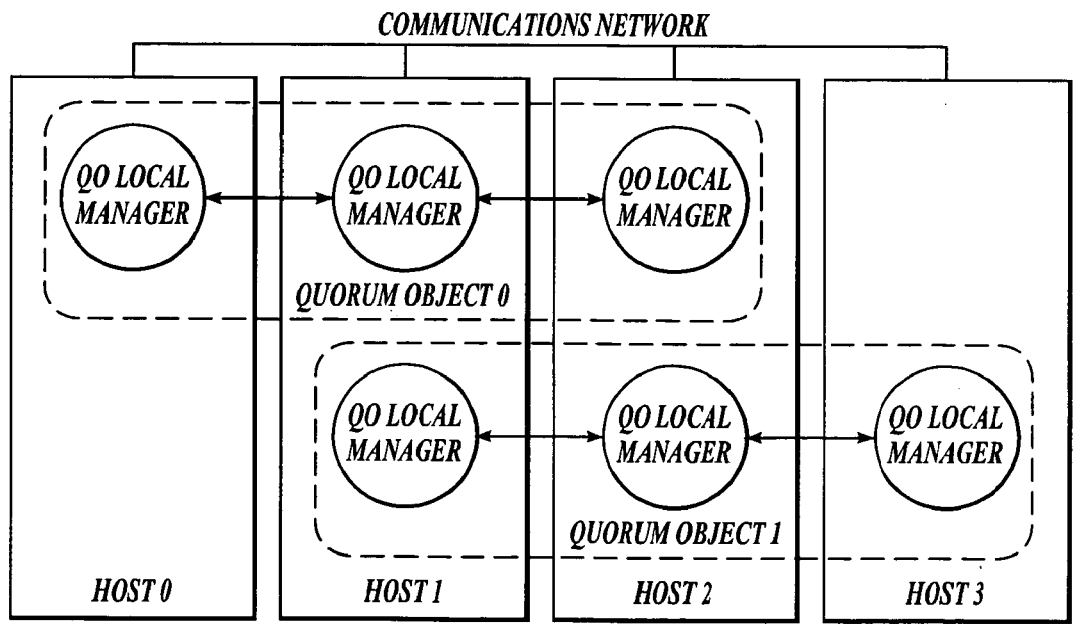
FIG. 9 shows an example of a cluster with four hosts and two quorum objects.

Each quorum object establishes its own quorum and designates a quorum leader among the computers on which it runs. In one embodiment, a quorum object is implemented as a distributed software program, called a QO local manager, that runs on each of cluster hosts to which it is mapped. An "instance" of the software program runs on each host, and these programs communicate by exchanging messages. For example, FIG. 9 shows a four-host cluster with two quorum objects. Quorum object 0 is mapped to hosts 0, 1 and 2, and quorum object 1 is mapped to hosts 1, 2, and 3. Each quorum object comprises three QO local managers running on separate hosts and communicating with their companion managers on the other hosts.

Figure 10:
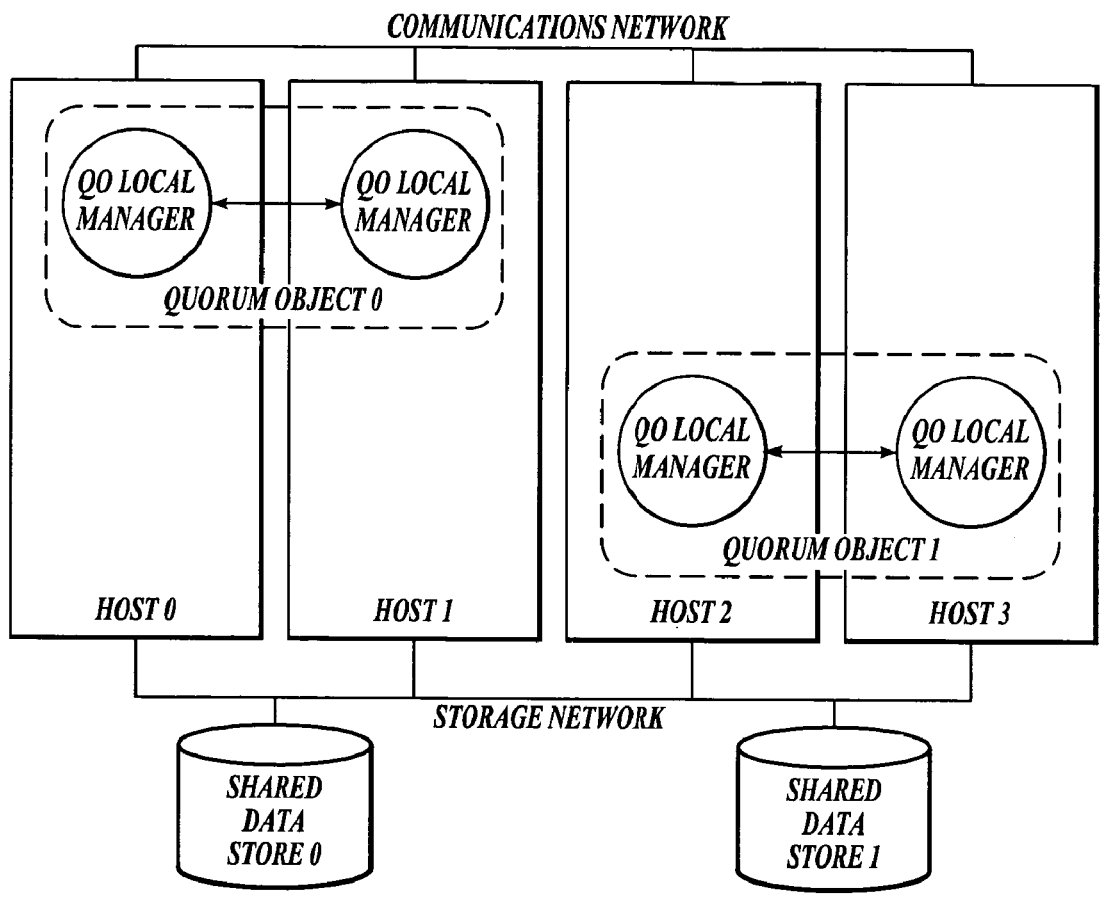
FIG. 10 shows an example of a cluster with four hosts, two shared store quorum objects and two data stores on a storage data network.

A quorum object can implement either a shared store quorum or a majority host quorum. The algorithms for implementing these quorums are prior art. In the case of a shared store quorum, each quorum objects accesses a different shared store, and all data stores are attached to a storage area network to which the cluster hosts are connected. For example, FIG. 10 shows a four-host cluster with two quorum objects and two shared stores. In this example, quorum object 0 could be mapped to data store 0, and quorum object 1 could be mapped to data store 1. In the case of a majority host quorum, as shown in FIG. 9, the quorum object uses the local data stores on the hosts to which it is mapped, and a storage area network among the cluster hosts is not required. Note that the use of quorum objects allows the cluster membership for a set of majority host quorums to have an even number of hosts, as shown in FIG. 9, since only individual, majority host quorum objects require an odd number of hosts. Quorum objects can be independently mapped to overlapping hosts as necessary to achieve good load-balance.

Figure 11:
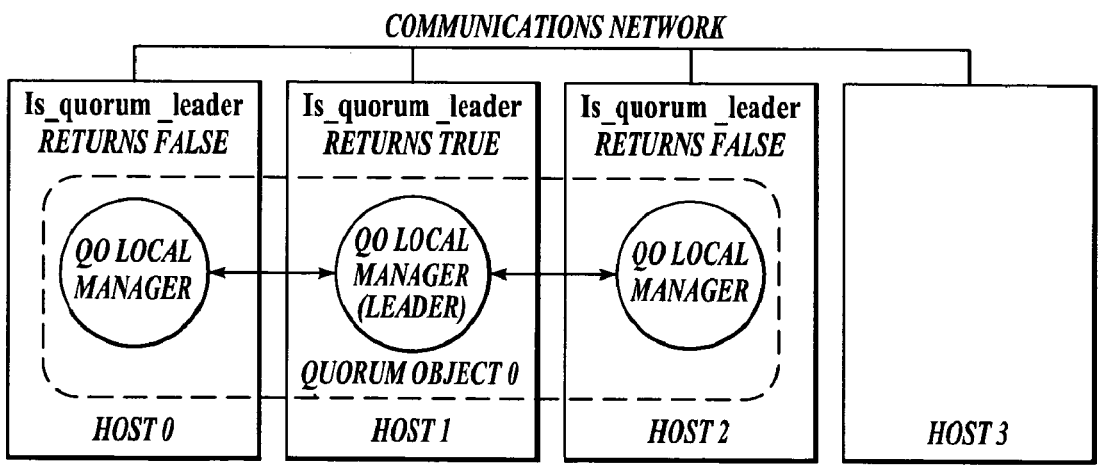
FIG. 11 shows an example of "Is_Quorum_Leader" software method in a quorum object.

For either a shared store or majority host quorum, a quorum object implements a software method that notifies each local cluster host on which it is mapped whether that host is the quorum leader. This method is implemented by each QO local manager within the quorum object, and the QO local managers cooperate to deliver consistent results to its users. In one embodiment, each QO local manager can implement a software function Is_quorum_leader which returns a Boolean value (i.e., TRUE or FALSE) indicating whether the local host is the quorum object's unique quorum leader. If the quorum object has established a quorum, exactly one of the quorum object's QO local managers returns TRUE; otherwise, all QO local managers return FALSE. FIG. 11 shows an example of the values returned by Is_quorum_leader for a majority host quorum with host 1 serving as quorum leader for quorum object 0. If the cluster host that serves as quorum leader fails, the quorum object attempts to re-establish the quorum, and after doing so, another host's QO local manager starts returning TRUE when this function is called. Note that a QO local manager can also be implemented to generate an asynchronous event when it becomes quorum leader or ceases to serve as quorum leader.

A quorum object is mapped to the number of cluster of hosts that are sufficient to implement the quorum and provide the desired high availability in case of a host failure. For example, a shared store quorum needs only two hosts to recover from a single host failure (as shown in FIG. 10). A majority host quorum requires three hosts to recover from a single host failure (as shown in FIG. 9), so that is can retain a majority of two hosts after one host fails. The quorum object can be mapped to additional hosts as necessary to increase its tolerance to host failures.

In one embodiment, hereinafter called the external mapping embodiment herein, the mapping of a quorum objects to cluster hosts is accomplished by an external software function, called a mapping agent. This agent makes use of the underlying cluster membership to determine which cluster hosts upon which to map a quorum object and creates QO local managers for the quorum object on those selected hosts. If a host to which a quorum object is mapped fails, the cluster membership notifies both the mapping agent and the quorum object's QO local manager on all surviving hosts. The quorum object determines whether a quorum still exists and accordingly adjusts the values of Is_quorum_leader in each cluster host's QO local manager. If the failed host is permanently removed from the cluster, the mapping agent can then remap the quorum object to a new replacement host. In order to rebalance the workload, it also can instruct the quorum object to remap to a new set of hosts, although this may suspend the quorum during the remapping. The quorum object encapsulates the details of re-establishing a quorum after a remapping.

Figure 12:
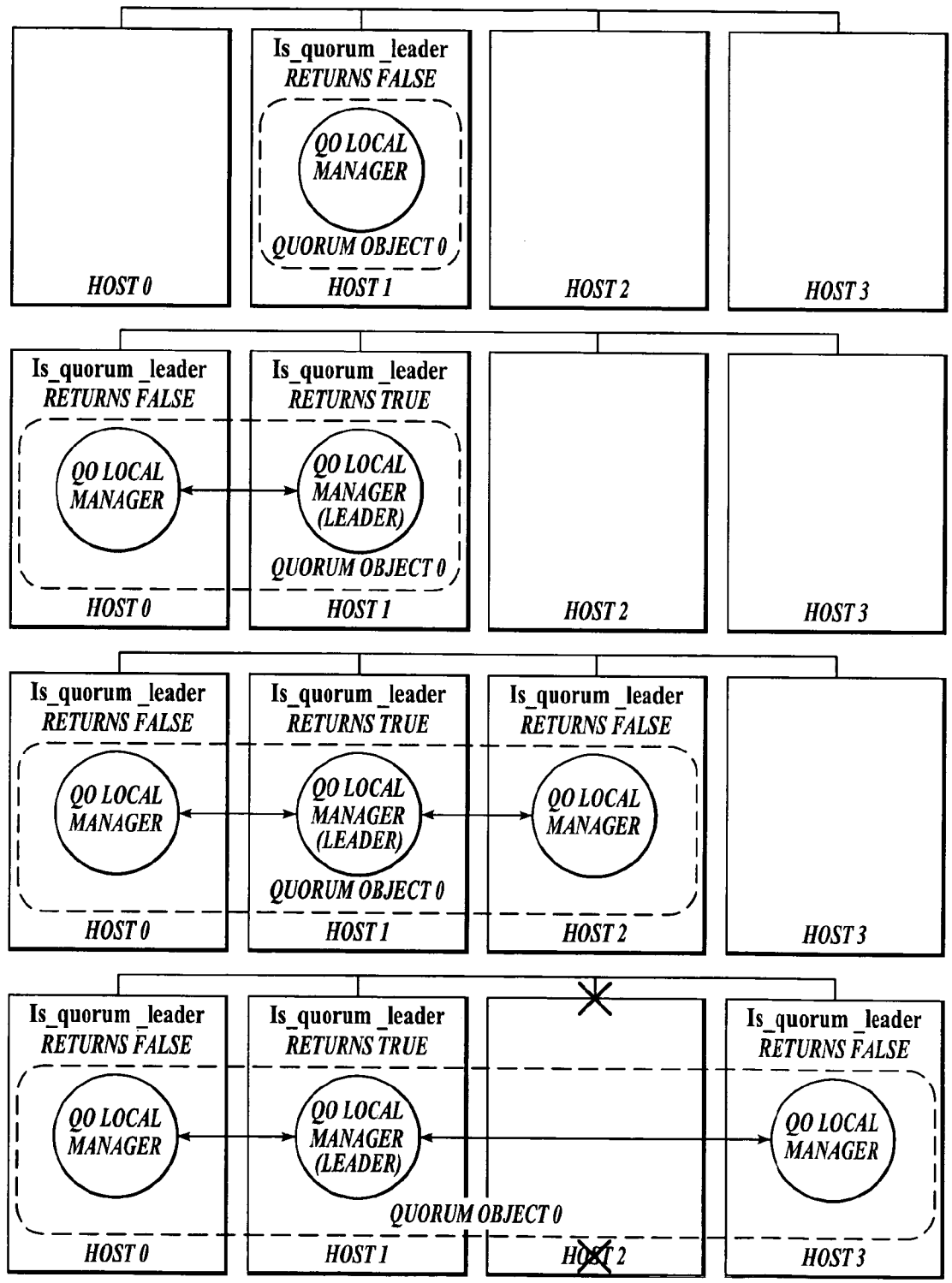
FIG. 12 shows the steps taken in the creation of a three host quorum object spanning neighboring hosts.
Figure 13:
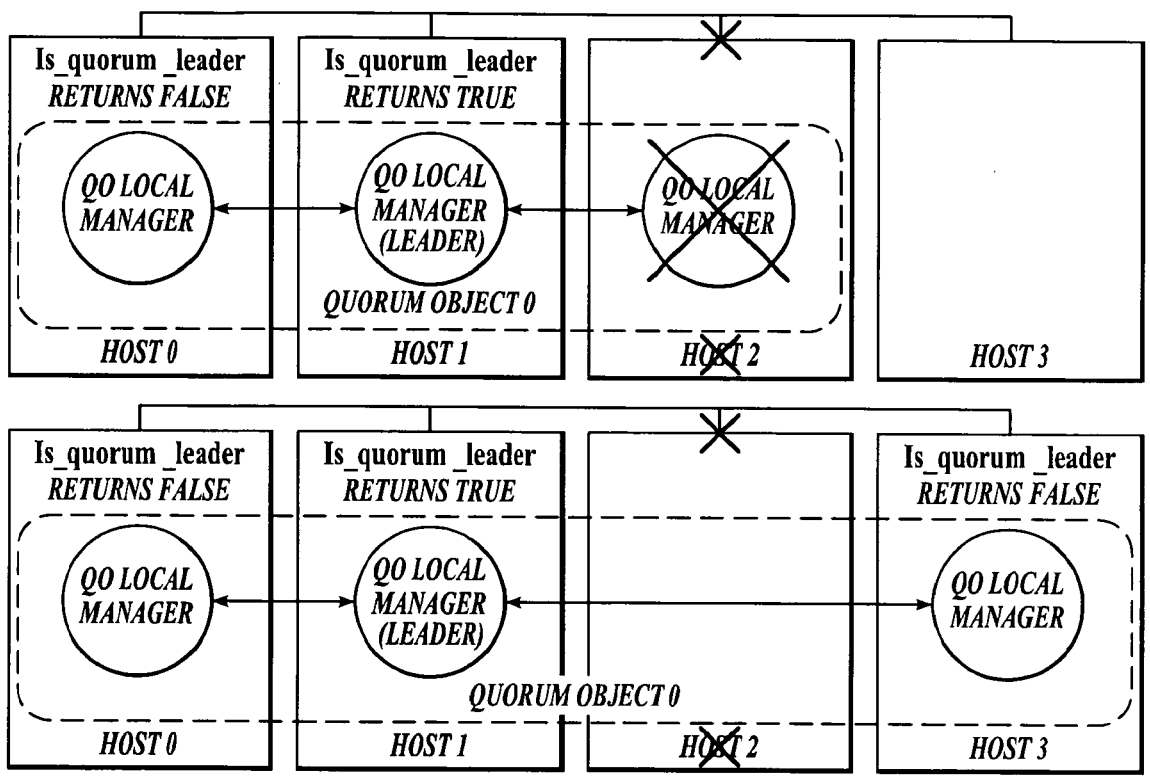
FIG. 13 shows the steps taken in recovery of a three-host quorum object after a cluster host permanently fails and is replaced by a new host.

In another embodiment, hereinafter called the self-organizing embodiment, relies on the use of an underlying method for constructing a cluster membership in which all cluster hosts are organized into a regular structure, such as an n-dimensional array so that each host can determine its neighboring host(s) in the structure. In this embodiment, the external mapping agent initially creates a quorum object on a single host, which causes a QO local manager to be created on this host. In order to establish a quorum, this resulting QO local manager then adds neighboring hosts from the cluster membership to the quorum object by creating QO local managers on those hosts. For example, a majority host quorum object that is to span three hosts would add its two nearest neighbors to the object, as shown in FIG. 12. In case a neighboring host permanently fails and is replaced by another cluster host, the quorum object would automatically create a QO local manager on the new neighbor, as shown in FIG. 13. Note that the use of a three-host quorum object ensures that the majority host quorum is not lost after one host fails. Likewise, the mapping agent can move the quorum object to a different cluster host for load-balancing purposes by instructing the quorum object to move its initial QO local manager to a different host. In this case, the QO local manager migrates its companion managers to neighboring hosts as necessary and then reestablishes a quorum.

Rationale and Benefits

By using multiple quorum objects mapped to distinct or overlapping hosts, the management of a processing load (for example, data partitions within a partitioned DBMS) can be uniformly spread across a large pool of cluster hosts. (Many load-balancing techniques are well known, and specific methods for load-balancing quorum objects across a set of cluster hosts is not described herein.) A quorum object manages each partition of the data store, and the workload is load balanced across the cluster hosts to which the quorum objects are mapped. Quorum objects can migrate among the cluster hosts as necessary to dynamically rebalance the processing load. The use of quorum objects thereby solves the problem of scaling quorum-based management of a partitioned data store across a single, uniform cluster membership. By avoiding the use of a super-cluster, it removes the need for each host to participate in two distinct cluster memberships, which incorporate redundant mechanisms for detecting host failures. It also enables finer control over the load-balance since quorum hosts can be mapped to arbitrary cluster hosts.

Software Methods for One Embodiment of the Present Invention

The following software methods show how one embodiment of the present invention can be implemented. These methods implement a self-organizing quorum object using a majority host's algorithm that spans three cluster hosts. (The use of three cluster hosts allows a simple, master/slave algorithm for determining the quorum leader to be employed.) As described above, this embodiment relies on the use of an underlying cluster membership in which all cluster hosts are organized into a one-dimensional array so that each host can determine its neighboring host(s) in the linear array. It is assumed that the cluster membership incorporates the necessary mechanisms within each cluster host to detect and report the addition, departure, and failure of neighboring hosts. For example, cluster membership algorithms typically employ periodic "heartbeat" message exchanges to detect host failures. The software methods also make use of a reliable message passing mechanism between cluster hosts so that multiple instances of these methods can communicate by sending messages.

Method to Add QO Local Managers to a Quorum Object

Figure 14:
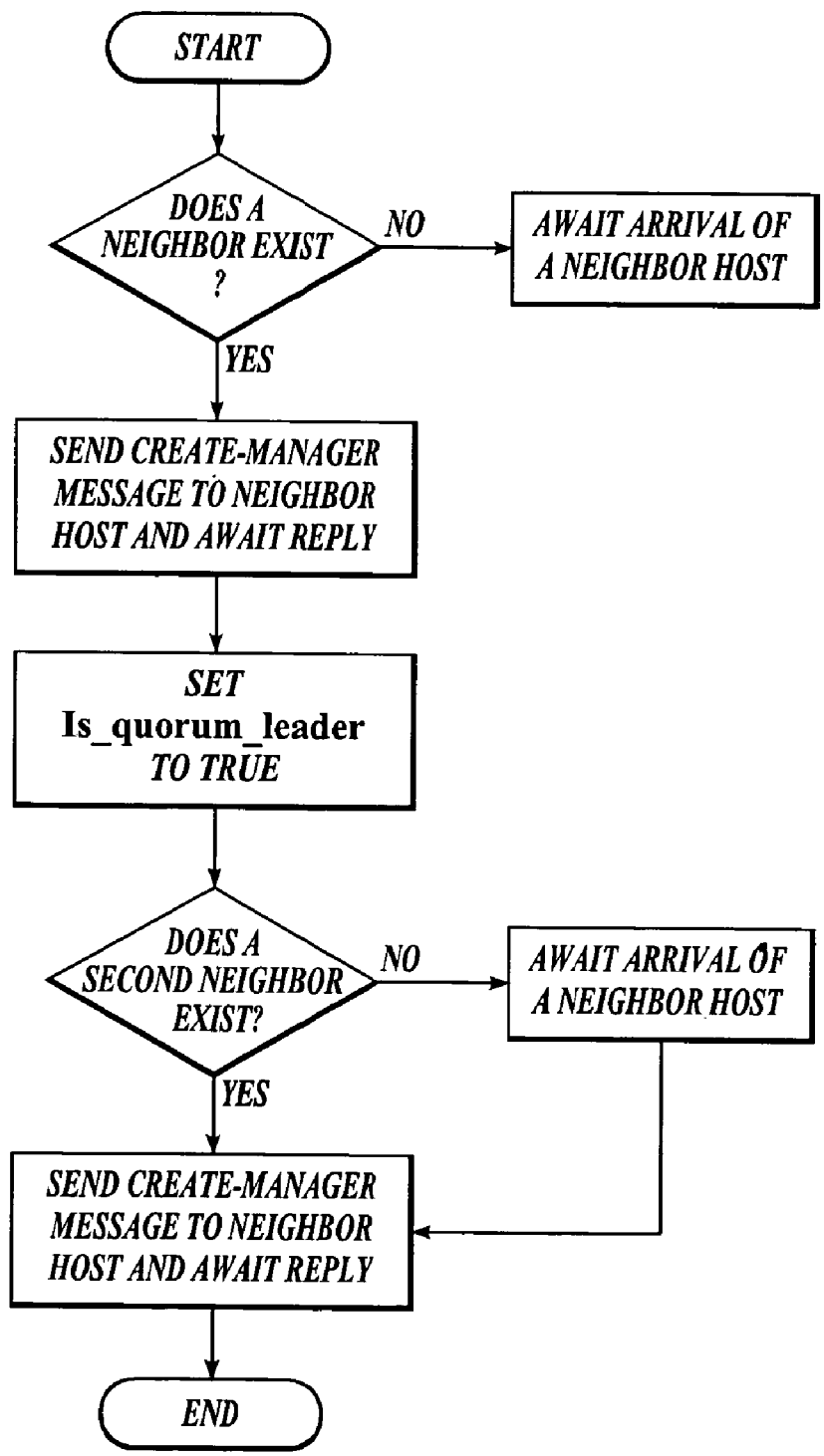
FIG. 14 shows the software method to add QO local managers to a quorum object.

An external mapping agent initially creates the quorum object by starting its QO local manager on a desired cluster host. In this implementation, this cluster host will serve as the quorum leader once a quorum has been established. The initial QO local manager, called the master manager, executes the software method shown in FIG. 14. After it determines that a neighboring host exists in the cluster membership, it starts a QO local manager, called a slave manager, on the neighboring host by sending a create-manager message to the neighboring host's run-time system, which creates a slave manager for the quorum object. The slave manager sends a create-reply message to indicate that it has started. Upon receiving this message, the master manager becomes the quorum leader and sets its response to the Is_quorum_leader function to TRUE. When the master manager determines that another neighboring host exists (it may need to await notification from the cluster membership if no host is immediately available), it repeats this process to start a second slave manager on the other neighboring host. The use of three QO local managers allows a quorum with a majority of hosts to be maintained if one host should unexpectedly fail.

Method to Recover From a Failed QO Local Manager

Figure 15:
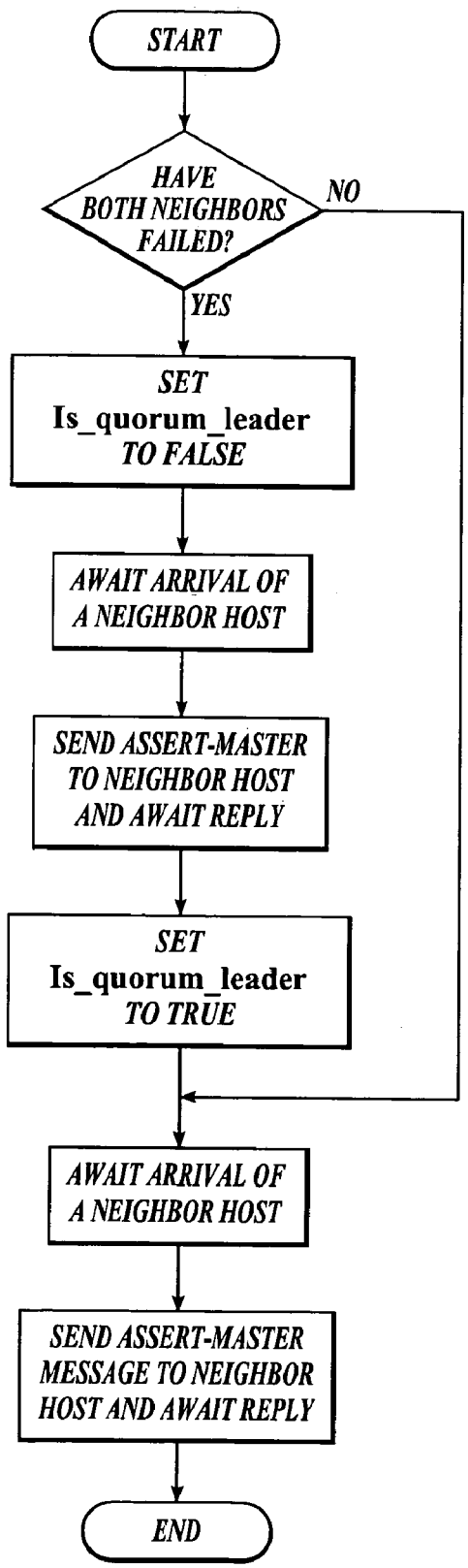
FIG. 15 shows the master manager's software method to recover from a failed slave manager.

FIG. 15 shows the algorithm executed by the master manager after the failure of one or more cluster hosts running its slave managers. The cluster membership notifies the master manager when a cluster host fails. Note that a communications failure which isolates the master manager's host can masquerade as the failure of all remote hosts. If both slave managers fail, the master manager sets its response to Is_quorum_leader function to FALSE since the quorum has been lost. In the case that the master manager is actually isolated only by a communications failure, the slave managers will separately form a quorum of two hosts. Next, the master manager waits until the cluster manager notifies it that the hosts running the slave managers have recovered. The master manager sends each recovered slave manager an assert-master message and awaits a reply. This message indicates to the slave managers to relinquish their quorum if one exists. After the first slave manager replies to the master manager, the master manager again becomes the quorum leader and sets its response to the Is_quorum_leader function to TRUE. In case a slave manager's host permanently fails, the master manager can create a new slave manager on a replacement host. (The method for doing this is not described in FIG. 15.)

Figure 16:
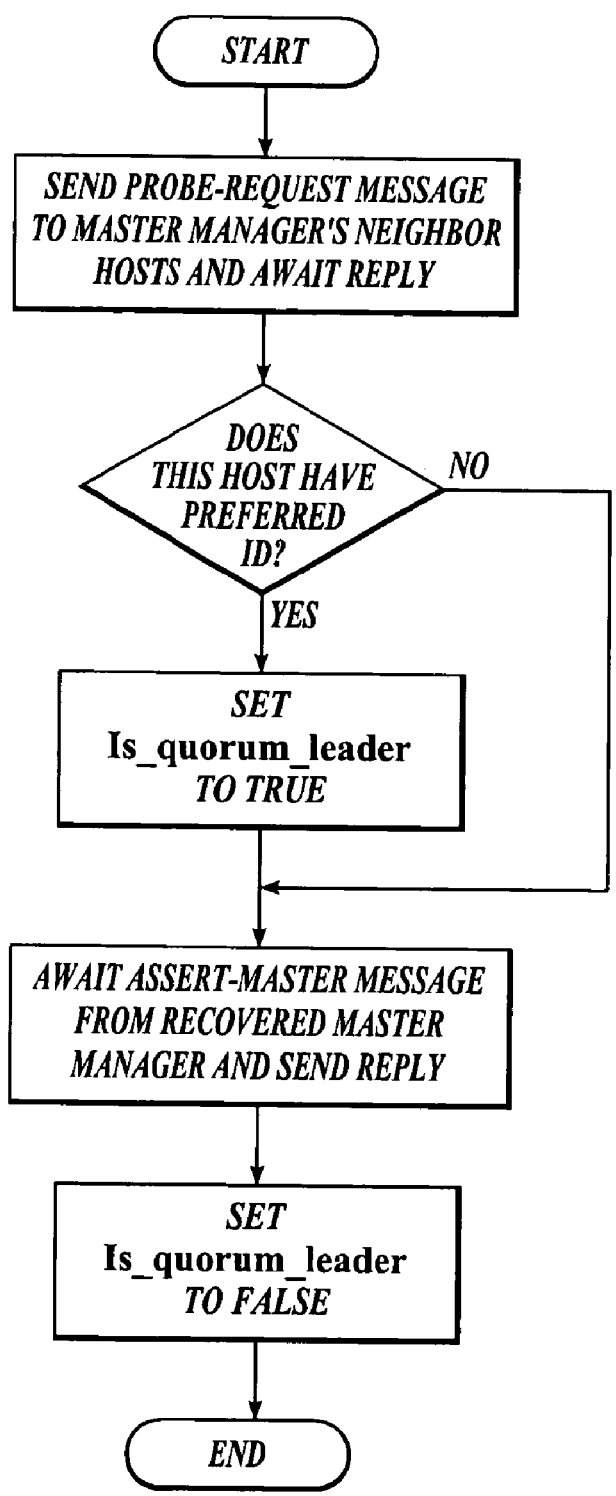
FIG. 16 shows a slave manager's software method to recover from a failed master manager

FIG. 16 shows the algorithm executed by the slave manager after the failure of the cluster host running its master manager. As with the master manager, the cluster membership notifies the slave manager when a cluster host fails, and a communications failure that isolates the slave manager's host can masquerade as the failure of all remote hosts. The slave manager attempts to re-establish the quorum by sending a probe-request message to the master manager's other neighboring cluster hosts on which another slave manager could be running. The slave manager determines the identifiers for these neighboring hosts from the cluster membership. Note that a slave manager may not be aware of the existence and location of the other slave manager because a failure may occur while the other slave manager is being initially mapped or remapped to a cluster host. If another slave manager for this quorum object receives the probe-request message, it returns a reply that identifies itself. After both slave managers perform this request/reply exchange, they can determine their mutual identities and select a quorum leader using a predefined algorithm, such as by selecting the host with the lower network address. One slave manager becomes quorum leader and sets its response to the Is_quorum_leader function to TRUE, and this re-establishes the quorum after the failure of the master manager. When the master manager later recovers, it send both slave managers an assert-master message, which causes the quorum leader to relinquish its mastership and to reset its response to the Is_quorum_leader function to FALSE. The slave manager replies to the master manager, wherein the master manager then takes over as quorum leader. In case the master manager's host permanently fails, the slave manager that serves as quorum leader can take over as master manager and create a new slave manager on a replacement host. (The method for doing this is not described in FIG. 16.)

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

I claim:

1. A method for coordinating the actions of multiple computers, called hosts, within a computing cluster to control the cluster's access to multiple, shared resources comprising:
   a) employing the use of multiple, independent quorum algorithms each of which is implemented as a separate logical construct called a quorum object, said quorum object controlling access to a single shared resource;
   b) assigning two or more hosts within the cluster to be members of each quorum object and to thereby use the quorum object to control access to the shared resource;

c) allowing any host to be a member of more than one quorum object so that the quorum objects can have overlapping memberships;

d) allowing new quorum objects to be created as needed and to be assigned to a subset of hosts within the cluster instead of requiring that multiple, additional hosts be added to the cluster as the exclusive members of a new quorum object; and e) thereby allowing the membership of a computing cluster to scale by adding a single host instead of by growing the size of a single quorum's membership or by requiring the addition of a new quorum and multiple, new hosts assigned exclusively to that quorum.

2. The method of claim 1 further including adding a host to a quorum object, said host designated as a quorum object's local quorum manager, to implement the host's participation in the actions of the quorum object by exchanging messages with other QO local managers, the method comprising:

a) coordinating the quorum object's local quorum managers by the use of a quorum object's master local manager, said quorum object's master local manager running on one member host and one or more slave quorum object's local managers running on the other member hosts to perform the actions of the quorum object, and b) adding a QO local manager to a quorum object when a host joins the membership of the quorum object.

3. The method of claim 2 further including selecting a new quorum object's master local manager upon the failure of one or more hosts in a particular quorum, the method comprising slave local managers selecting a new quorum object's master local manager upon the detected failure of the current master local manager.

4. The method of claim 2 wherein the quorum object's master local manager relinquishes its master status upon the detected failure of all current slave local managers and reasserting its mastership upon the slave local manager's recovery.

* * * * *